United States Patent [19]
Amir et al.

[11] Patent Number: 5,606,858
[45] Date of Patent: Mar. 4, 1997

[54] ENERGY RECOVERY, PRESSURE REDUCING SYSTEM AND METHOD FOR USING THE SAME

[75] Inventors: Nadiv Amir, Rehovot; Meir Rigal, Doar Na Auth; Yoel Gilon, Jerusalem, all of Israel

[73] Assignee: Ormat Industries, Ltd., Yavne, Israel

[21] Appl. No.: 197,601

[22] Filed: Feb. 17, 1994

Related U.S. Application Data

[63] Continuation-in-part of Ser. No. 94,875, Jul. 22, 1993.

[51] Int. Cl.$^6$ .................................................. F01K 25/10
[52] U.S. Cl. .................................................... 60/648
[58] Field of Search ........................................ 60/648, 660

[56] References Cited

U.S. PATENT DOCUMENTS

| | | | |
|---|---|---|---|
| 4,220,009 | 9/1980 | Wenzel | 60/648 |
| 4,387,575 | 6/1983 | Wenzel | 60/648 |
| 5,003,782 | 4/1991 | Kucerija | 60/648 |

FOREIGN PATENT DOCUMENTS

| | | |
|---|---|---|
| 2345689 | 3/1974 | Germany. |
| 2706702 | 8/1978 | Germany. |
| 2709036 | 9/1978 | Germany. |
| 1096265 | 12/1967 | United Kingdom. |

*Primary Examiner*—Leonard Heyman
*Attorney, Agent, or Firm*—Donald M. Sandler

[57] ABSTRACT

An energy recovery, pressure reducing system according to the present invention for reducing high pressure gas in a transmission pipeline to a lower pressure in a consumer pipeline includes a primary pressure regulator or regulating valve having an adjustable flow control opening, the pressure regulating valve being selectively connectable between the transmission and consumer pipelines for throttling the high pressure gas and producing low pressure gas when the primary pressure regulator or regulating valve connects the pipelines. A bypass line shunts the primary pressure regulator or regulating valve for connecting the pipelines when the primary pressure regulating valve is disconnected from the pipelines. The bypass line includes an expander system having at least one expander for expanding the high pressure gas in the gas transmission pipeline and producing work and lower pressure gas that is supplied to the consumer pipeline. Preferably, a generator is coupled to the expander for converting work produced by the pressure regulating of the high pressure gas in the expander to electricity which is supplied to an electrical load. A fast acting, selectively adjustable pressure regulator or regulating valve apparatus is connected in parallel with the expander system. Finally, a control system is provided, responsive to a reduction in flow through the expander system for rapidly switching the apparatus from a non-operational state in which no gas is transmitted between the transmission and the consumer pipelines, to an operational state in which high pressure gas is throttled to the lower pressure in the consumer pipeline and transmitted thereto.

9 Claims, 5 Drawing Sheets

ENERGY RECOVERY, PRESSURE REDUCING SYSTEM AND METHOD FOR USING THE SAME

This application is a continuation-in-part of copending application Ser. No. 094,875 filed Jul. 22, 1993.

FIELD OF THE INVENTION

This invention relates to an energy recovery, pressure reducing system, and apparatus therefor, as well as to a method for using the same.

BACKGROUND OF THE INVENTION

Natural gas and other gases, such as combustible gases, are routinely transported to users via high pressure pipelines. Conventionally, natural gas extracted from a production well in one part of the country is first locally conditioned and then supplied to a high pressure gas transmission pipeline for long distance transfer to users sometimes thousands of miles away. Because of the frictional losses in the pipeline, compressor stations are regularly located along the length of the pipeline to maintain the high pressure therein.

Near a user location, it is conventional to provide a metering and regulating station whose function is to reduce the gas pressure to a level consistent with local transmission to one or more users such as industrial customers, electrical utilities, domestic customers, etc. A typical metering and regulating station would include a pressure regulating system including one or more pressure regulators or regulating valves each of which includes a regulated flow control opening established by a variable orifice or movable diaphragm that throttles the gas for reducing its pressure to a level compatible with local distribution and/or use. Conventional pressure regulators or regulating flow control valves are usually pneumatically operated by a downstream sensor so as to maintain a preselected range of downstream pressures in the face of changes in local demand, etc., and also usually in face of changes in upstream pressure.

Throttling of a high pressure gas wastes the energy expended in the process of reducing the gas pressure; and one solution to recovering some of this energy is to expand the gas in an expander. In such case, the high pressure gas expands in a rotary machine such as a radial flow expander coupled to a generator, and the pressure reduction in the expander is converted to electricity. Thus, the expander/generator constitutes an energy recovery, pressure reducer that duplicates the function of a conventional pressure regulating valve in a pressure reducing station. In this manner, some of the energy expended to pressurize the gas is recovered.

Because a temperature drop accompanies the pressure drop through the expander, any moisture in the gas is likely to freeze detrimentally affecting the operation of the expander and utilization devices downstream of the expander. It has been suggested therefore to preheat the gas before it is applied to the expander, and to this end, it is conventional to burn fuel for this purpose.

This solution to energy recovery, while conventionally used in refineries, is not presently acceptable in pipeline systems because the expanders and their associated equipment adversely impact on the operational of the pipeline. Where an energy recovery, pressure reducer is used in a pressure reducing station on a pipeline, conventional design requires the energy recovery, pressure reducer to shunt the conventional pressure regulator or regulating valve of the metering and regulating station to permit alternative operation when one or the other of the components must be taken off-line for maintenance, for example. Switching operation from the energy recovery, pressure reducer back to the pressure regulator or regulating valve is a major problem in a pipeline because of shock waves introduced into the pipeline by sudden changes in flow rate accompanying such switching. These shock waves travel upstream and downstream of the pressure reducing station and adversely affect upstream pressure reduction stations as well as upstream compressor stations and other components. Furthermore, the down time associated with component failures in a energy reducing, pressure reducer is a further problem.

It is therefore an object of the present invention to provide a new and improved energy recovery, pressure reducing system and/or apparatus and a method for using the same which eliminates, or substantially reduces, the above-mentioned problems with the prior art.

BRIEF DESCRIPTION OF THE INVENTION

An energy recovery, pressure reducing system according to the present invention for reducing high pressure gas in a transmission pipeline to a lower pressure in a consumer pipeline includes a primary pressure regulator or regulating valve having an adjustable flow control opening for metering the volumetric flow through the valve, and selectively connectable between the transmission and consumer pipelines for throttling the high pressure gas and producing low pressure gas when the primary pressure regulator or regulating valve connects the pipelines. A bypass line shunts the primary pressure regulator or regulating valve for connecting the pipelines when the primary pressure regulator or regulating valve is disconnected from the pipelines. The bypass line includes an expander system having at least one expander for expanding the high pressure gas in the gas transmission pipeline and producing work and lower pressure gas that is supplied to the consumer pipeline. Preferably, a generator is coupled to the expander for converting work produced by the expansion of the high pressure gas in the expander to electricity which is supplied to an electrical load.

Fast acting, selectively adjustable apparatus is preferably connected in parallel with the expander system. This apparatus has an operational state in which high pressure gas from the transmission line is throttled to said low pressure and transmitted to said consumer pipeline, and a non-operational state in which no gas is transmitted. Finally, a control system, responsive to a reduction in flow through the expander system below a threshold, rapidly switches the apparatus from its non-operational state to its operational state in a manner that minimizes the production of shock waves in the transmission and consumer pipelines due to such switching. This allows the energy recovery, pressure reducing system of the invention to be taken off-line quickly, for example, for maintenance purposes substantially without introducing shock waves that propagate upstream and downstream in the pipelines.

Preferably, the fast acting apparatus of the energy recovery, pressure reducing system according to the present invention includes a pressure regulator or regulating valve, having a flow control valve opening, serially connected to an on/off valve. Furthermore, the control system is responsive to flow through said expander system in excess of the threshold for maintaining the on/off valve in its off state thereby maintaining the fast acting apparatus in its non-operational state, and for maintaining the flow control opening in the pressure regulator or regulating valve in the fast acting apparatus at a setting consistent with the flow through said expander system. Under this condition, i.e., flow through the expander system in excess of the threshold, there is no flow through the pressure regulator or regulating valve of the fast acting apparatus, but its flow control opening is set consistent with the flow through the expander system. That is to say, the flow control opening is set to a value which, were high pressure gas flowing through this pressure regulator or regulating valve, the flow control opening would introduce the same pressure drop as the expander system introduces, and the same flow would result. Consequently, the fast acting apparatus operates as a hot stand-by ready to rapidly accept and transmit the high pressure gas to the consumer pipeline as soon as the flow through the expander system drops below the threshold.

The control system of the invention is constructed and arranged to respond to a reduction in flow through said expander system below said threshold for rapidly switching the on/off valve to its on state whereby flow is switched smoothly from the expander system to said apparatus. Preferably, the control system includes a sensor for sensing, for example, the amount of electricity generated by said generator, said sensor being constructed and arranged so that the flow control opening is modulated in accordance with variations in flow through said expander system while such flow exceeds said threshold.

In one embodiment of the energy recovery, pressure reducing system according to the invention, the primary pressure regulator or regulating valve constitutes the pressure regulating valve in the fast acting apparatus. This embodiment amounts to a retrofit of existing gas transmission pipelines. In a second embodiment, the fast acting apparatus is in the form of an additional bypass shunting the expander system.

The invention also consists in a method by which high pressure gas in transmission pipelines is reduced to a lower pressure in a consumer line, and energy involved in the reduction is recovered using the apparatus described herein in a manner also herein described.

BRIEF DESCRIPTION OF THE DRAWINGS

Embodiments of the present invention are described by way of example with reference to the accompanying drawings.

DETAILED DESCRIPTION OF THE PREFERRED EMBODIMENTS

Figure 1:
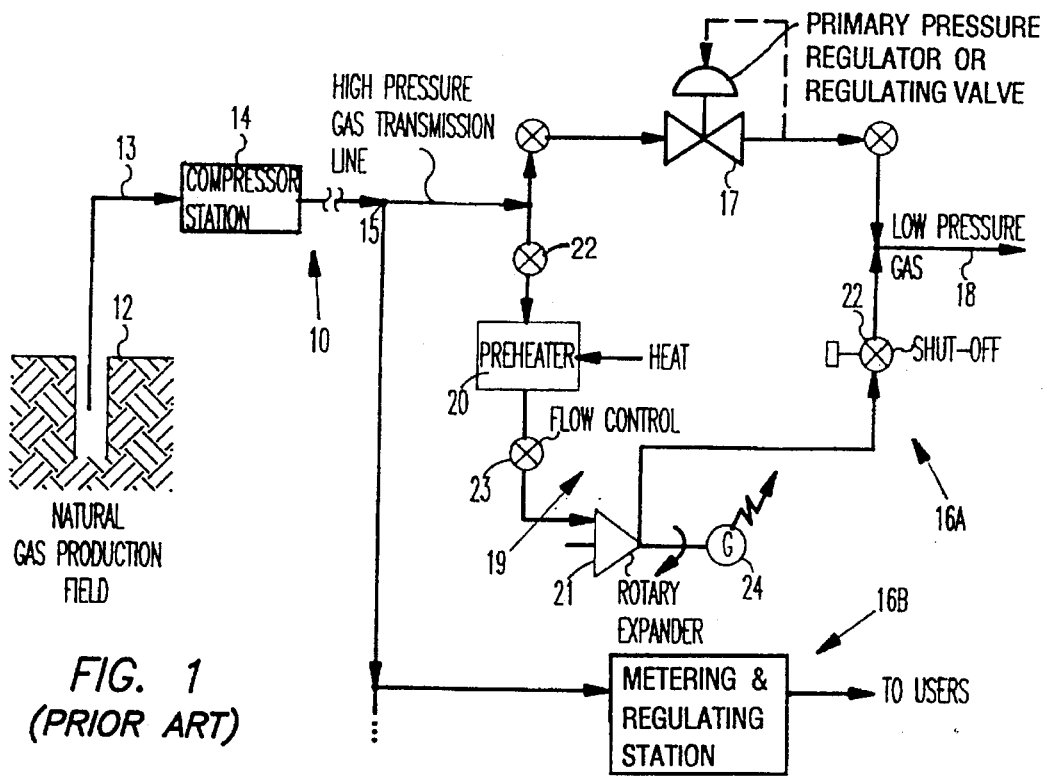
FIG. 1 is a schematic representation of a conventional pipeline system involving compressor stations located along the gas transmission line and a plurality of pressure reduction stations at user locations.

Referring now to the drawings, reference numeral 10 designates a conventional high pressure gas transmission system for supplying, for example, natural gas from a production field at one location to a plurality of users at remote locations. Specifically, system 10 includes gas production field 12 for producing high pressure gas which may be locally conditioned in accordance with conventional practice and then supplied to high pressure gas transmission line 13 which may be thousands of miles in length. Compressor station 14 is representative of compressor stations that are located at regular intervals along transmission line 13 for the purpose of boosting the pressure of the gas to take into account frictional losses experienced by the gas in the transmission line.

At one or more branch points 15 located in the vicinity of a user, one or more pressure reduction stations 16A, 16B, etc. are provided. Each pressure reduction station includes a main or primary pressure regulator or regulating valve which interconnects gas transmission line 13 with consumer transmission line 18. Pressure regulator or regulating valve 17 is conventional and includes a pneumatically regulated flow control opening (not shown) whose size is modulated by the regulator such that the pressure in the consumer pipeline remains substantially constant in the face of fluctuations in flow rates to the consumer and usually in the pressure of transmission line 13. Shunting pressure regulator or regulating valve 17 is bypass line 19 which optionally includes preheater 20 serially connected to rotary expander 21 through control valve 23. Shutoff valve 22 is provided for effecting a disconnection of the rotary expander from the operation, and flow control 23 permits regulation of the flow through the expander. Preferably, expander 21 is a radial flow, rotary machine.

Coupled to expander 21 is electrical generator 24, the coupling between the expander and generator usually including a gear reducer (not shown).

In operation, shutoff valve 22 may be closed and pressure regulator or regulating valve 17 may be operational for the purpose of supplying low pressure gas to consumer pipeline 18. As indicated, usually valve 17 is effective to maintain the pressure in consumer transmission line 18 at a substantially constant level independently of fluctuations in consumer flow rates, and usually also of pressure fluctuations in transmission line 13. In order to bring the energy recovery, pressure reducing system 19 into operation, the flow through pressure regulator or regulating valve 17 would have to be terminated, and valve 22 opened. Any rapid variation in the states of regulator or regulating valve 17 and valve 22 usually generates shock waves that propagate upstream as well as downstream from the pressure reduction station and have detrimental affects on the operation of upstream pressure reduction stations as well as upstream compressor stations and other components.

In any event, valve 22 eventually is opened and regulator or regulating valve 17 is closed. High pressure gas from the pipeline then flows through the bypass, entering preheater 20 if this device is utilized. In the preheater, external heat obtained by either burning fuel or by using electrical power, heats the gas as flow control valve 23 regulates the flow into radial flow expander 21. In the expander, the pressure of the high pressure gas is reduced as energy is extracted due to the pressure drop and generator 24 delivers electricity into an electrical load.

As indicated above, when either expander 21 or generator 24 must be stopped, for example, for maintenance, valve 22 should be shut. Often, because of the nature of the failures involved in the expander and the generator, rapid closing of shutoff valve 22 is required with the attendant generation of shock waves that propagate upstream and downstream of the pressure reduction station. This has the detrimental effects noted above; and for this reason, pressure reduction stations of the type shown are not widely used in high pressure gas transmission pipelines.

Figure 2:
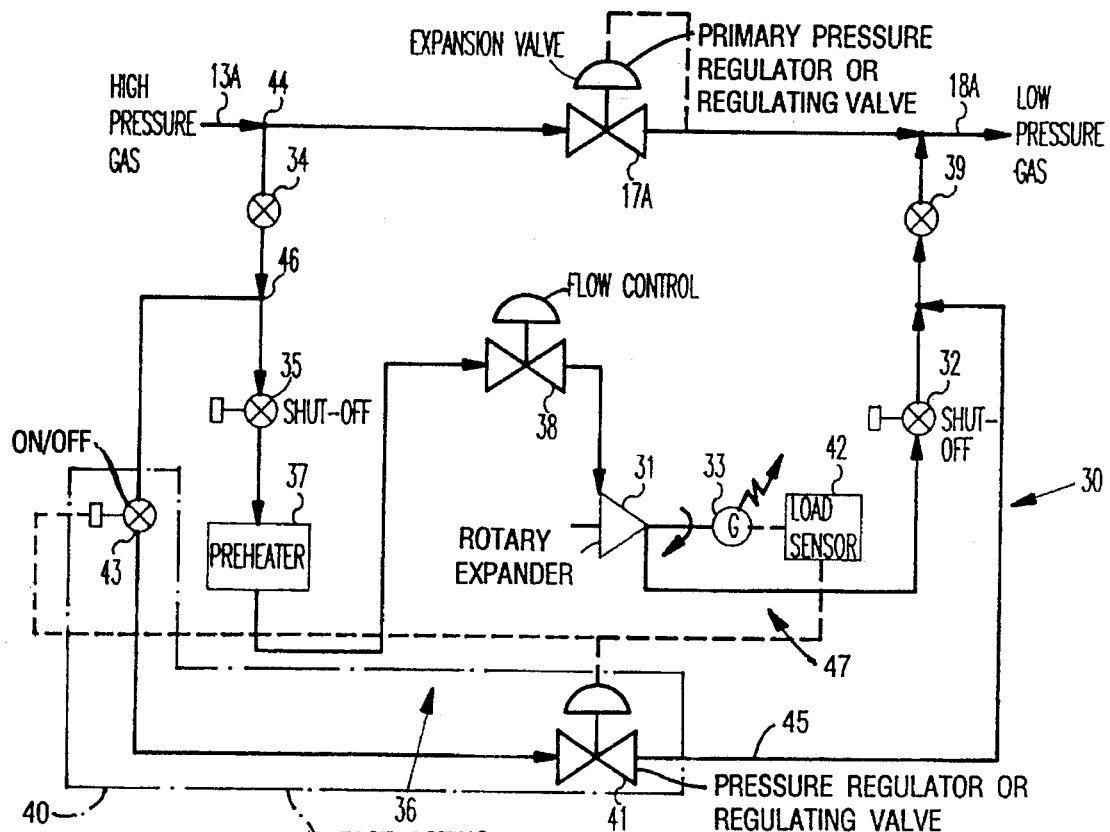
FIG. 2 is a schematic diagram showing one embodiment of an energy recovery, pressure reducing system according to the present invention.

A pressure reduction station according to the present invention, and as shown in FIG. 2, overcomes the problems described above in that the energy recovery, pressure reducing system becomes transparent in the sense that the pressure in and flow rate through consumer pipeline 18A is independent of whether the expander is operational or not. As shown in FIG. 2, energy recovery pressure reducing system 30 includes conventional pressure regulator or regulating valve 17A interposed between low pressure consumer pipeline 18A and high pressure transmission line 13A as in a conventional system. Shunting this pressure regulating valve is a bypass line including an expander system, e.g., a rotary expander system, having at least one rotary expander 31, preferably of the radial rotary type, for expanding high pressure gas in high pressure transmission line 13A and producing work and low pressure gas that is supplied to consumer pipeline 18A via shutoff valve 32. Expander 31 preferably is coupled to generator 33, usually through a gear reduction box (not shown) for converting work produced by expander 31 to electricity which is supplied to an electrical load. As indicated below, the gear box maybe eliminated by suitable staging of the expander.

Figure 2A:
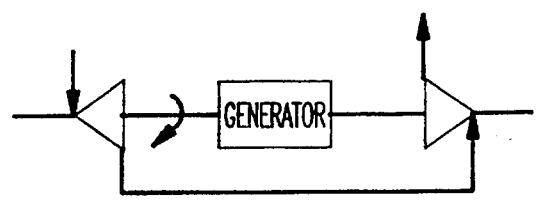
FIGS. 2A–D are schematic representations of embodiments of a pressure reducing system that incorporates a plurality of expanders.
Figure 2B:
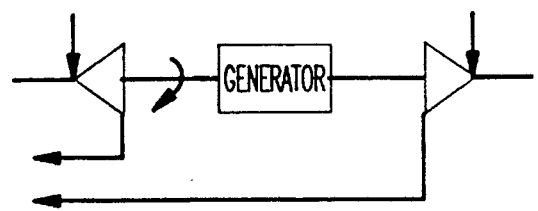
Figure 2C:
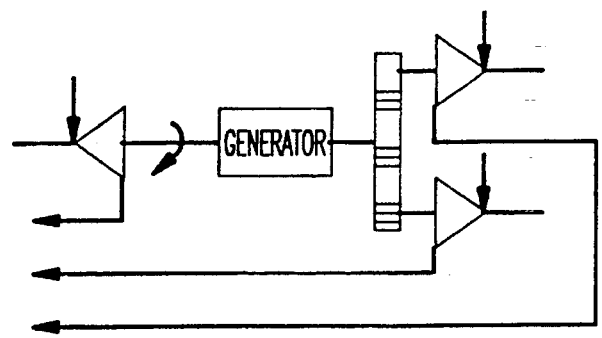
Figure 2D:
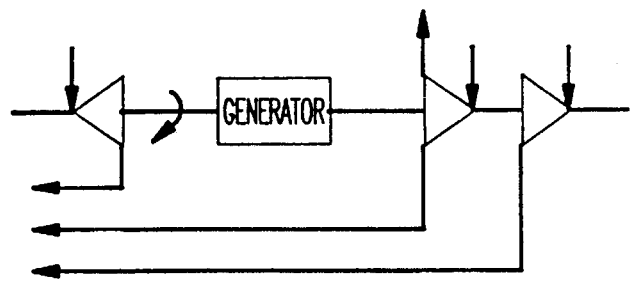

When the expander system includes more than one expander, the expanders can be arranged to operate in parallel. In such a case, two expanders can operate a shared generator where preferably the shared generator is interposed between the two expanders (e.g., see FIG. 2B). Furthermore, two expanders may be operated in series such that the output shaft of each can drive a shared generator also preferably interposed between these two serial expanders (e.g., see FIG. 2A). In such a manner, the use of gears can be avoided and the operating speed of the expanders can be reduced from 3600 to 1800 RPM, or even to 1500 RPM or other low speed. If preferred, two or more parallel or serial operated expanders can be connected via a gear box to a shared electric generator. Such a generator may be interposed between these expanders and another expander (e.g., see FIG. 2C) or expanders which also may be connected to the generator via a gear box. Moreover, the shaft of one such expander may be connected to another expander with the shaft of the second one being connected to a shared electric generator, and with the other side of this generator being connected to another expander or expanders (e.g., see FIG. 2D). By using the same shared or interposed electric generator, savings on electrical installation can be achieved.

In operation, high pressure gas flows through valve 34 and through shutoff valve 35 which is a part of bypass line 36. Preheater 37 is optional, and usually provides the necessary increase in temperature of the high pressure gas so as to insure that freezing conditions do not prevail in the expander when water vapor is present in the compressed gas.

From the preheater, the high pressure gas passes through flow control valve 38 before being supplied to expander 31. Flow control valve 38 serves to establish the design flow rate through bypass line 36. Finally, the low pressure gas exiting expander 31 passes through shutoff valve 32 and valve 39 into consumer pipeline 18A. This much of the system is substantially the same as that shown in FIG. 1.

Since flow control valve 38 serves to establish the design flow rate through bypass line 36 and expander 31 in particular, the expander system can be designed to operate in place of a plurality of expanders, such that the expander may operate at partial admission, with the flow control valve being used to provide the desired flow. While the efficiency of expanders operating in such a manner (i.e., operating quite often at off-design conditions) will be lower than if separate expanders were operated at their design flow rate, this is not so important in the present invention because the efficiency of pressure reducing expanders, in any case, is quite low. If preferred, a plurality of valves can be provided and used instead of flow control valve 38. This aspect, as well as the other aspects of the present invention, permits the present invention to follow changes in flow conditions.

Additionally, the pressure reducing expanders considered for use in the present invention are designed to operate at a pressure ratio of about 2:1, or more preferably, around 4:1.

According to the present invention, a fast acting, selectively adjustable, pressure regulator or regulating valve apparatus is preferably connected in parallel with the expander system. Such apparatus has an operational state in which high pressure gas from transmission pipeline 13A is throttled to a low pressure and transmitted to consumer pipeline 18A, and a non-operational state in which no gas is transmitted. In the embodiment of the invention shown in FIG. 2, the fast acting apparatus 40 is in the form of additional bypass line 45 provided with selectively adjustable pressure regulator or regulating valve 41 having a variable flow control opening (not shown) serially connected to on/off valve 43. When valve 43 is open, apparatus 40 is in its operational state in which high pressure gas from transmission line 13A is throttled by valve 41 to the low pressure associated with consumer line 18A.

The state of apparatus 40 is controlled by control system 47 which is responsive to a reduction in flow through the expander system below a threshold for rapidly switching apparatus 40 from its non-operational state to its operational state in a manner that minimizes the production of shock waves in the transmission and consumer pipelines due to such switching.

To accomplish this, the operation of pressure regulator or regulating valve 41 and on/off valve 43 is controlled preferably by load sensor 42 which monitors the level of electrical output of generator 33. A suitable converter is required for translating the electrical signals produced by sensor 42 into signals suitable for controlling the operation of regulator or regulating valve 41. When the output of sensor 42, which is directly related to the mass flow of gas through expander 31, exceeds a threshold, the entire system will operate as designed with all of the gas from the transmission line flowing through the expander system, and none flowing through bypass line 45. When expander 31 is operational by reason of the opening of valves 35 and 32, and the isolation of pressure regulator or regulating valve 17A by suitable operation of the valves, usually valves 17A, 34, 39, and 43, generator 33 will develop a preselected amount of electricity in accordance with the setting of flow control 38, and user demand for gas. The amount of electricity may be modulated by consumer demand, etc., but in general will exceed a threshold determined by the operator.

Although no gas is flowing through bypass line 45, sensor 42 will establish and maintain an flow control opening in regulator or valve 41 of a size consistent with the flow through the expander system. Sensor 42 is effective to cause the flow control opening in regulator or valve 41 to track the flow through the expander system so that regulator or valve 41 is, at all times, ready to accept the flow through the expander system should such flow be switched to bypass 45 by operation of valve 43. In other words, the size of the flow control opening in regulator or valve 41 established by sensor 42 at all times would introduce between the transmission line and the customer pipeline, the same flow and pressure drop as currently achieved by the expander system.

When the operation of expander 31 is reduced, for example, by closing valves 32 and 35, the operation of generator 33 will be reduced; and this condition is sensed by sensor 42 which signals fast acting on/off valve 43 to open quickly, to effect a substantially similar or larger flow rate, as the case might be, through pressure regulating valve 41 to compensate for the change in flow through the expander. This is also the case when the operation of generator 33 is reduced.

Preferably, in order to ensure that the transmission of shock waves is minimized, the state of valve 43 is altered prior to closing valves 32 and 35. In fact, before a valve is to be closed in the operation of the present invention, and other valves are to be opened, or the flow through a valve is to be increased to preserve the continued flow of gas, the closing of the valve is delayed until the other valves are opened or their opening is increased. In such a manner, the flow rate from the high pressure transmission line to the consumer pipeline is maintained without introducing shock waves that propagate upstream of the pressure reducing station.

Thus, the control system of the present invention provides for controlling the size of the flow control opening of selectively adjustable pressure regulating valve 41 in accordance with the output of the expander system even when valve 43 is closed using a signal from sensor 42. This permits the additional bypass line, substantially immediately, to provide the required gas flow rate when fast-acting on/off valve 43 is opened as a consequence of a reduction in the operation of generator 33. Moreover, further control means can be provided for controlling the size of the flow control opening of regulator or regulating valve 41 also when gas is flowing through additional bypass line 45.

Furthermore, the electric generators preferably provided for the expanders can be asynchronous or synchronous according to what is most suitable. In addition, the present invention is also suitable as a retrofit for upgrading systems.

Preheater 37 may also be operational in situations where freezing of vapor in the output of the expander is not a problem. For example, the preheater may be utilized during peak hours of electrical consumption for the purpose of increasing the output of the expander. The output is increased because the heating of the compressed gas increases its pressure thereby increasing the amount of work that the expander is capable of producing and consequently increasing the output of generator 33. If the incremental cost of the electrical power generator by generator 33 is sufficiently high, the cost of preheating the gas will be small enough to make the preheating economically valuable.

While in accordance with the present invention, the preheater, designated by reference numeral 37 in FIG. 2, is shown as operating only on bypass line 36, the preheater can be located upstream of nodes 44 or 46 shown in FIG. 2. This modification ensures that gas flowing through pressure regulator or regulating valve 17A, as well as gas flowing through adjustable bypass pressure regulator or regulating valve 41 in additional bypass line 40, will be at a temperature that prevents freezing of water vapor in the gas that flows through the respective pipes and valves. Moreover, the heat output of the preheaters may be adjustable to accommodate changes in the rate of gas flow.

The preheater or preheaters referred to above are shown as heating gas before it flows through the expander. However, when a number of expanders are used, e.g., in series, heating of the gas may be carried out before the first expander, or only between expanders, or even only after the last expander (e.g., see FIG. 2E). Such heating can also be carried out, if preferred, in addition to preheating or heating between the expanders as well. In such a manner, the size of the heat transfer surfaces used in carrying out the preheating or heating, respectively, can be reduced.

Figure 2E:
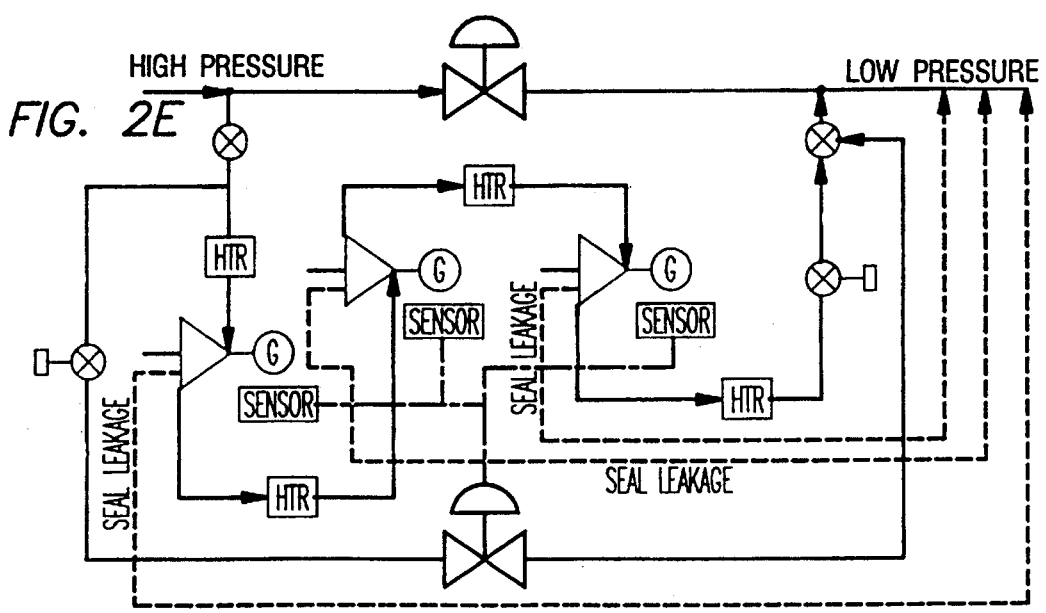
FIG. 2E is a schematic block diagram of apparatus according to the present invention showing the location of additional preheaters or heaters, and an optional embodiment for handling seal leakage on the expanders.
Figure 2F:
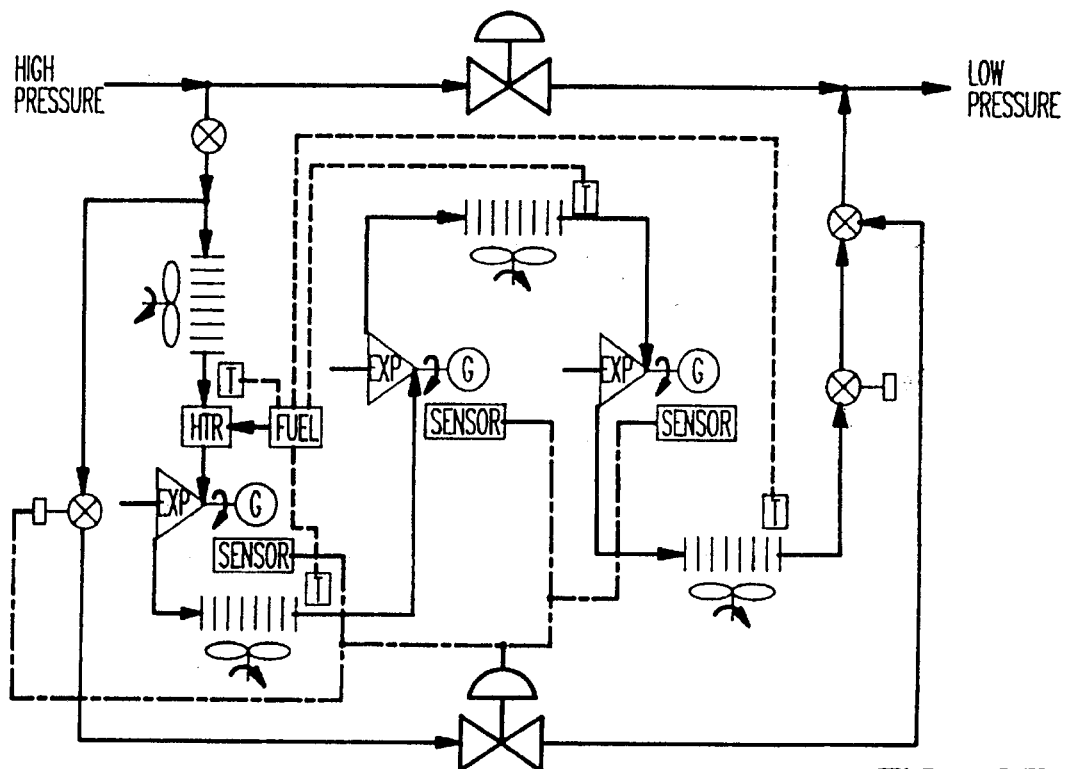
FIG. 2F is a schematic block diagram of apparatus according to the present invention showing another embodiment of the invention.
Figure 2G:
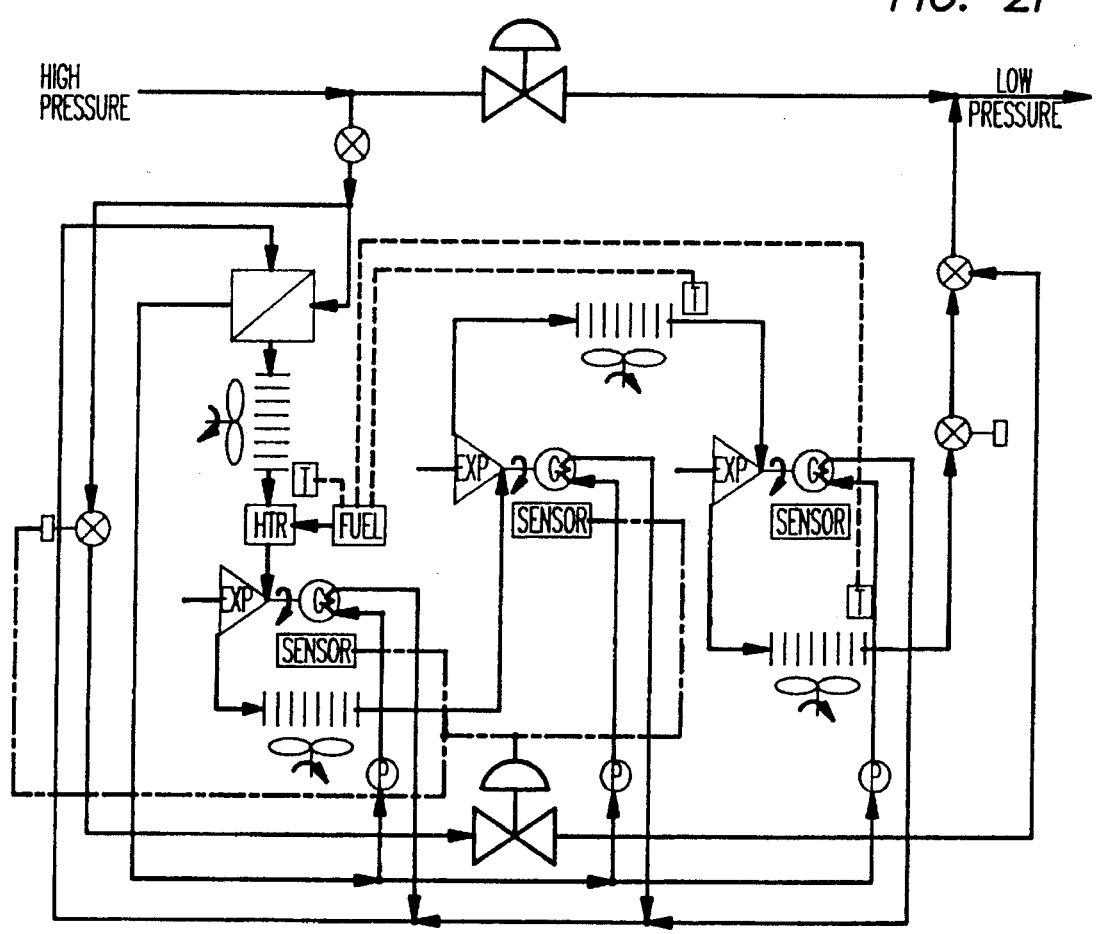
FIG. 2G is a schematic block diagram of apparatus according to the present invention showing a further embodiment of the invention.

Furthermore, such heating or so called reheating and preheating, as shown in FIGS. 2F and 2G, can be used as well even when only one expander is used or present in the system.

In addition, while in FIG. 2E, the heaters or so-called reheaters and preheaters, are shown and described in the embodiment described as being present before and/or after, and/or between the expanders, the heater or so-called reheater present and operating after the expander or expanders, preferably can be an air cooled heater or heat exchanger as shown in FIG. 2F. In such case, fan-assisted ambient air is used to heat the gas exiting the expander or expanders. Moreover, if heaters are between the expanders, when several expanders are used, fan-assisted ambient air can be used for heating. If preferred, the heaters or reheaters can be heated by other sources of heat such as heat contained in sea water, river water, surface or fresh water as well as other sources of heat. In addition, an additional preheater using ambient air, preferably fan-assisted, as the heating medium can be advantageously used, if preferred. In such a system, temperature sensors associated with the air heaters can be provided for sensing the temperature of the gas flowing in the expander system. Signals generated by the sensors are sent to the upstream preheater, operated by fuel, such as natural gas, for controlling the rate and quantity of fuel burned in the preheater.

Often, the temperature of the ambient air will be sufficient to preheat the gas entering the expander or expanders since, usually, the temperature of the gas supplied to the expander or expanders will be close to the ground or earth temperature which often will be below air temperature. In addition, if preferred, waste heat instead of, or in addition to, heat contained in the ambient air can be used to heat or preheat the gas entering the expanders.

Additionally, if preferred, the electric generators, which may be provided for generating electricity from the power produced by the expanders and which is usually supplied to an electric grid, can be cooled by cooling means using a cooling medium preferably cooling water. Such cooling will maintain the performance of the generators at their nominal conditions, and is shown in FIG. 2G. Heat extracted from the generators can be utilized for preheating the gas being supplied to the expanders using, e.g., a circulation system like that shown in FIG. 2G for supplying cooling water heated by the electric generators to the upstream heat exchanger or preheater. Also here, the amount of fuel used to heat or preheat the gas entering the expander or expanders can be controlled and reduced or kept to a minimum by sensing the temperature of the gas exiting the water heat exchanger or preheater. The signals produced as a result can be used to control the amount of fuel used in the fuel operated heater or preheater.

In addition, ambient air can also be used to heat or preheat the gas entering the expander or expanders and/or between and/or after the expanders. By sensing the temperature of the gas exiting the heaters, control signals are available to control the amount of fuel used in the fuel operated heater or preheater as described in the embodiment of FIG. 2F. If preferred, the heaters or reheaters can be heated by other sources of heat such as sea water, river water, surface or fresh water as well as other sources of heat. In addition, if preferred waste heat instead of, or in addition to, these sources of heat, can be used to heat or preheat the gas entering the expanders.

Figure 2H:
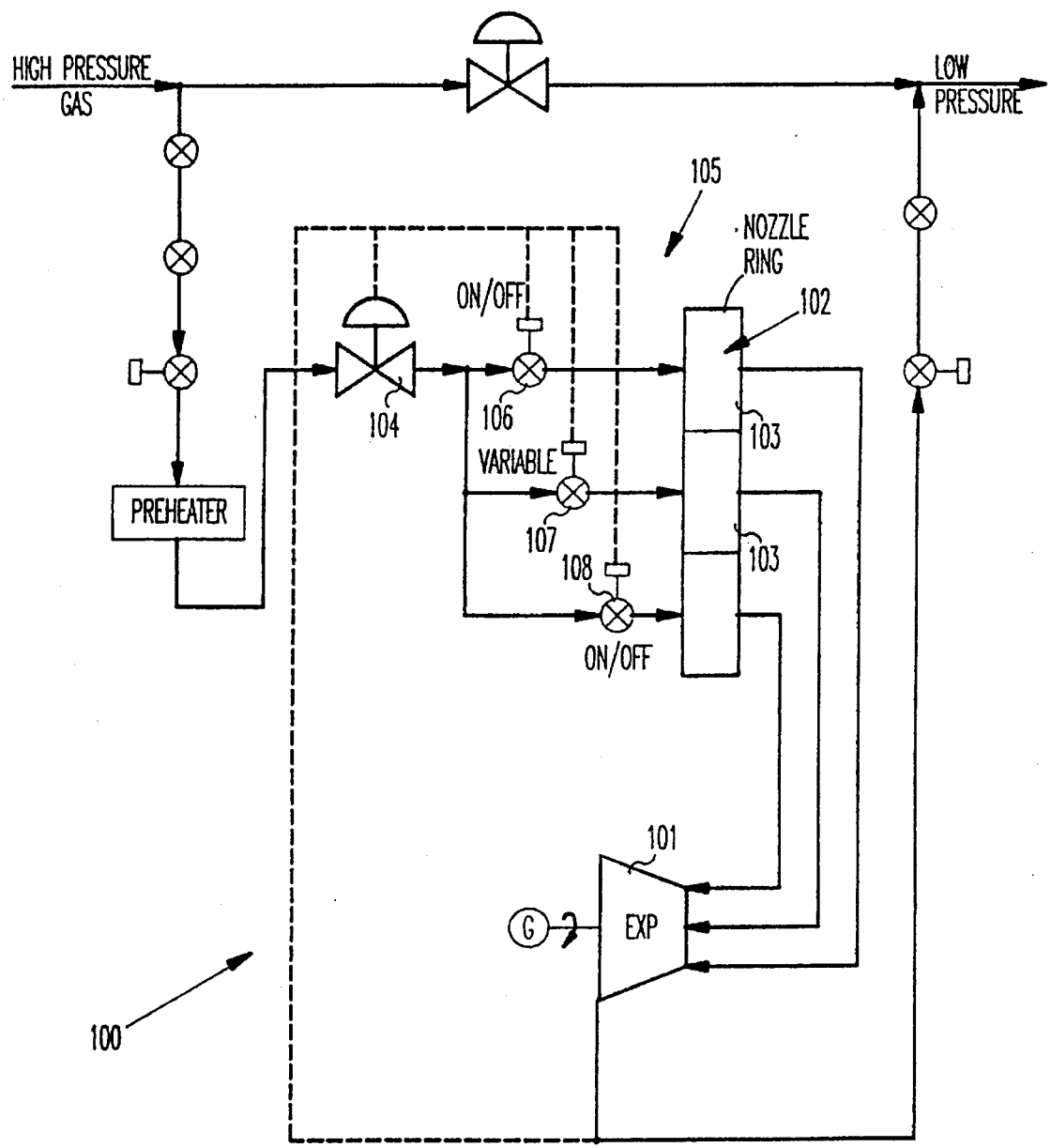
FIG. 2H is a schematic block diagram of apparatus according to the present invention showing a still further embodiment of the invention.

FIG. 2H shows an example of how the flow rate entering an expander are expanders can be controlled and an example of how partial admission to an expander can be performed. Specifically, embodiment 100 includes expander 101 which is provided with nozzle ring 102 having a plurality of separate compartments 103 each of which is individually fed with high pressure gas that passes through flow control valve 104 which is a conventional flow control valve that is operated in response to the the downstream pressure at the output of the expander in a manner that maintains a substantially constant mass flow of gas. Valve system 105 controls the distribution of high pressure gas passing through valve 104 into nozzle ring 102. In the drawings, three valves 106, 107, and 108 are shown in connected in parallel to the outlet of valve 104 and individually connected to compartments 103 of the nozzle ring. Preferably, valves 106 and 108 are on/off valves and valve 107 is a metering valve having the ability to infinitely vary the flow therethrough from zero flow to maximum flow. The operation valves 106, 107, 108 are controlled by the signals developed by the control system associated with flow control valve 104. These valves control the partial admission of gas to the expander in a way that maximizes the efficiency of the expander and extracts the maximum amount of energy from the expanding gas.

In addition, gas leaking from the expander seals can be piped to low pressure pipeline 18A (e.g., see FIG. 2E). Alternatively, and particularly when the distance to the low pressure pipeline 18A is considerable, gas leaking from the seal of a high pressure expander can be supplied to a lower pressure expander where the pressure is consistent with the pressure of the leaking gas. Also, according to the present invention, shut-off valves 35 and 32, as well as valve 43 positioned in bypass line 40 are preferably fast acting valves (see FIG. 2E). Furthermore, while the description refers to using the expander or expander system for producing electric power, the expander or expander system of the present invention can be used merely for producing mechanical power or drive, to run, for example, a compressor of a cooling system, or reciprocating means, compressor, or engine, for example.

In the embodiment of the invention described above, fast acting, selectively adjustable, pressure regulator or regulating valve apparatus 40 is separate from primary pressure regulator or regulating valve 17A which allows this embodiment to be incorporated into an existing pressure reduction station without disturbing the existing pressure regulator or regulating valve. In the second embodiment of the invention shown in FIG. 3, the primary pressure regulator or regulating valve itself constitutes the pressure regulating valve of the fast acting, selectively adjustable, pressure regulator or regulating valve apparatus.

Figure 3:
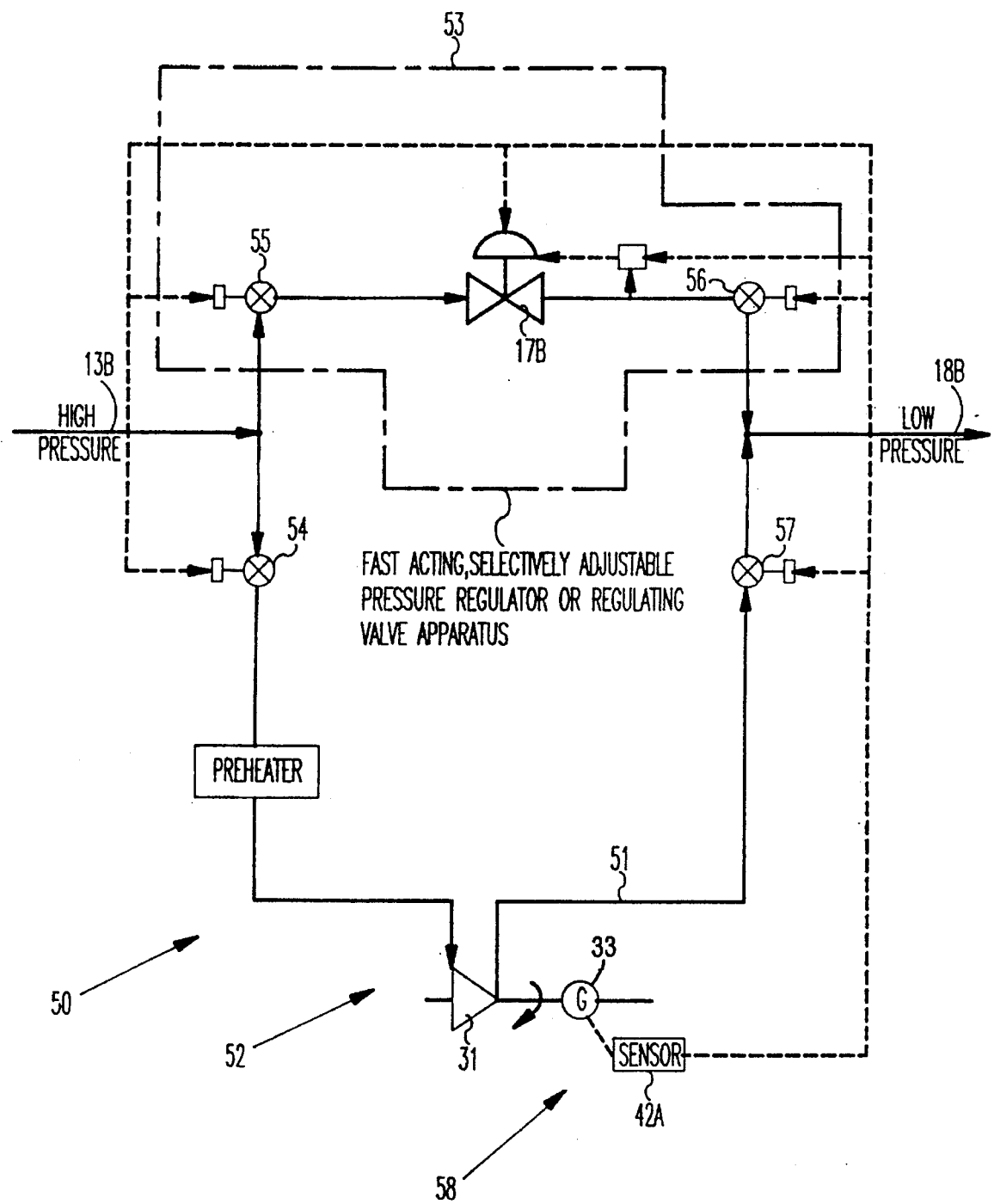
FIG. 3 is a schematic diagram showing a second embodiment of an energy recovery, pressure reducing system according to the present invention.

Referring now to FIG. 3, energy recover, pressure reducing system 50 includes primary pressure regulator or regulating valve 17B and bypass line 51 shunting valve 17B. Bypass line 51 includes expander system 52 having expander 31 (which may be constructed as indicated in FIGS. 2A–E), and preferably generator 33 coupled to the expander. Fast acting, selectively adjustable, pressure regulator or regulating valve apparatus 53 is connected in parallel with expander 31 through valves 55 and 56 which are fast acting on/off valves. Apparatus 53 has an operational state in which high pressure gas from transmission pipeline 13B is throttled to the low pressure of pipeline 18B, and a non-operational state in which no gas is transmitted.

System 50 also includes control system 58 which is responsive to a reduction in flow through expander 31 below a threshold for rapidly switching apparatus 53 from its non-operational state to its operational state in a manner that minimizes the production of shock waves in pipelines 13B and 18B due to such switching in a manner described previously.

Fast acting apparatus 53 includes pressure regulator or regulating valve 17B having a variable flow control opening (not shown) serially connected to on/off valve 55. In this embodiment, the size of the flow control opening in pressure regulator or regulating valve 17B is also continuously modulated by the output of sensor 42A even though no flow through this valve occurs due to valves 55 and 56 being closed, and valves 54 and 57 being open. Preferably, valves 54 and 57 are also fast-acting valves Control system 58 in this embodiment, like in the first embodiment, is responsive to flow through expander 31 in excess of a threshold for maintaining on/off valve 55 in its off state thereby maintaining apparatus 53 in its non-operational state, and for maintaining the flow control opening in pressure regulator or regulating valve 17B at a setting consistent with the flow through expander 31. The control system, is responsive to a reduction in flow through expander 31 below a threshold, for rapidly switching apparatus 53 from its non-operational state to its operational state by opening valves 55 and 56, and closing valves 54 and 57, in a manner that minimizes the production of shock waves in pipelines 13B and 18B due to such switching as previously described. Shock waves are preferably minimized by first opening valves 55 and 56, and then closing valves 54 and 57. This allows the portion of the energy recovery, pressure reducing system of the invention having the expander system to be taken off-line quickly for maintenance purposes, for example, without introducing shock waves that propagate upstream and downstream in the pipelines.

Control means also can be provided or used for controlling the size of the adjustable flow control opening of pressure regulator or regulating valve 17B when gas is flowing through this valve. Moreover, pressure regulator or regulating valve 17B, or valve 41 in the embodiment of FIG. 2, can be in shunt with one or a plurality of expanders. Furthermore, while the above description refers to a fast-acting on/off valve, i.e., valve 43 in the embodiment of FIG. 2 for opening and closing additional bypass line 45, one two-way fast-acting valve (commonly referred to as a three-way valve in the industry) can be used for opening and closing both bypass line 36 having the expander system and additional bypass line 45 instead of valves 35 and 43. This is also the case in the embodiment of FIG. 3 such that two-way, fast-acting valves can be used instead of valves 55 and 54, as well as valves 56 and 57 both for opening and closing gas flow through pressure regulator or regulating valve 17B, as well as for opening and closing bypass line 51 having the expander system. Preferably, in a manner similar to that described above, the portion of the three way valve opening will open before the portion of the three way valve closing in order to inhibit the production of shock waves.

Additionally, the gas exiting the expander system, additional bypass line 45 (disclosed in the embodiment of FIG. 2), or the main pressure regulator or reducer valve 17A or 17B (disclosed in the embodiments of FIGS. 2 and 3) can be used for cooling purposes, such as refrigeration, air conditioning, etc. Also, the control system of the present invention includes means for optimizing the profits produced by the operation of the expander system.

It is to be emphasized that portions of the present invention described above and in relation to the figures constitute inventions in there own entirety. In addition, systems and apparatus comprising and/or incorporating portions of the present invention described above also constitute inventions in their own entirety. Moreover, the whole system and apparatus described above also constitutes an invention in its own entirety.

The advantages and improved results furnished by the method and apparatus of the present invention are apparent from the foregoing description of the preferred embodiment a) a primary pressure regulator or regulating valve selectively having an adjustable flow control opening, and connectable between the transmission and consumer pipelines for throttling the high pressure gas and producing low pressure gas when said primary pressure regulating valve is connected between said pipelines;

b) a bypass line shunting said primary pressure regulating valve for connecting said pipelines when said primary pressure regulating valve is disconnected from said pipelines, said bypass line including an expander system having at least one expander for expanding said high pressure gas and producing work and low pressure gas that is supplied to said consumer pipeline, and a generator coupled to said expander for converting said work to electricity which is supplied to an electrical load;

of the invention. Various changes and modifications may be made without departing from the spirit and scope of the invention as described in the appended claims.

We claim:

1. An energy recovery, pressure reducing system for reducing high pressure gas in a transmission pipeline to a low pressure gas in a consumer pipeline, said system comprising:

a) a primary pressure regulator connected between the transmission and consumer pipelines for throttling the high pressure gas and producing low pressure gas;

b) a bypass line shunting said primary pressure regulating valve for connecting said pipelines said bypass line including an expander system having at least one expander for expanding said high pressure gas and producing work and low pressure gas that is supplied to said consumer pipeline, and a generator coupled to said expander for converting said work to electricity;

c) a heater for burning fuel to heat high pressure gas before it enters said at least one expander;

d) a fuel source for metering fuel to said heater; and e) a sensor for sensing the temperature of the high pressure gas before it enters said heater and producing control signals indicative of the temperature of said high pressure gas;

f) said fuel source being responsive to said control signals for controlling the amount of fuel metered to said heater as a function of said temperature.

2. An energy recovery, pressure reducing system for reducing high pressure gas in a transmission pipeline to a low pressure gas in a consumer pipeline, said system comprising:

a) a primary pressure regulator connected between the transmission and consumer pipelines for throttling the high pressure gas and producing low pressure gas;

b) a bypass line shunting said primary pressure regulating valve, said bypass line including a flow control valve serially connected to an expander for expanding said high pressure gas and producing work and low pressure gas that is supplied to said consumer pipeline, and a generator coupled to said expander for converting said work to electricity;

c) said flow control valve being constructed and arranged to control the flow of gas therethrough in response to gas pressure downstream of said expander and to produce control signals functionally related to the flow of gas through said flow control valve;

d) a nozzle ring associated with said expander and having separate compartments for controlling the entry into said expander of gas flowing through said flow control valve;

e) a plurality of adjustable flow valves connected in parallel to said flow control valve and individually connected to said compartments for connecting said flow control valve to said nozzle ring; and f) means for adjusting said adjustable flow valves in response to said control signals.

3. An energy recovery, pressure reducing system according to claim 2 including a preheater for heating the high pressure gas supplied to said expander system.

4. An energy recovery, pressure reducing system according to claim 2 wherein said expander system includes a rotary expander.

5. An energy recovery, pressure reducing system according to claim 2 wherein said expander system includes a plurality of rotary expanders.

6. An energy recovery, pressure reducing system according to claim 5 including preheaters for heating the high pressure gas supplied to said rotary expanders.

7. A system according to claim 2 including:

a) a heater for burning fuel to heat high pressure gas before it enters said at regulator valve;

b) a fuel source for metering fuel to said heater; and c) a sensor for sensing the temperature of the high pressure gas before it enters said heater and producing control signals indicative of the temperature of said high pressure gas;

d) said fuel source being responsive to said control signals for controlling the amount of fuel metered to said heater as a function of said temperature.

8. An energy recovery, pressure reducing system for reducing high pressure gas in a transmission pipeline to a low pressure gas in a consumer pipeline, said system comprising:

a) a regulating valve connected between the transmission and consumer pipelines for throttling the high pressure gas and producing low pressure gas;

b) a bypass line shunting said primary pressure regulating valve for connecting said pipelines, said bypass line including an expander system having at least one expander for expanding said high pressure gas and producing work and low pressure gas that is supplied to said consumer pipeline, and a generator coupled to said expander for converting said work to electricity;

c) a heater for burning fuel to heat high pressure gas before it enters said at least one expander;

d) a fuel source for metering fuel to said heater; and e) a sensor for sensing the temperature of the high pressure gas before it enters said heater and producing control signals indicative of the temperature of said high pressure gas;

f) said fuel source being responsive to said control signals for controlling the amount of fuel metered to said heater as a function of said temperature.

9. An energy recovery, pressure reducing system for reducing high pressure gas in a transmission pipeline to a low pressure gas in a consumer pipeline, said system comprising:

a) a regulating valve connected between the transmission and consumer pipelines for throttling the high pressure gas and producing low pressure gas;

b) a bypass line shunting said primary pressure regulating valve, said bypass line including a flow control valve serially connected to an expander for expanding said high pressure gas and producing work and low pressure gas that is supplied to said consumer pipeline, and a generator coupled to said expander for converting said work to electricity;

c) said flow control valve being constructed and arranged to control the flow of gas therethrough in response to gas pressure downstream of said expander and to produce control signals functionally related to the flow of gas through said flow control valve;

d) a nozzle ring associated with said expander and having separate compartments for controlling the entry into said expander of gas flowing through said flow control valve;

e) a plurality of adjustable flow valves connected in parallel to said flow control valve and individually connected to said compartments for connecting said flow control valve to said nozzle ring; and f) means for adjusting said adjustable flow valves in response to said control signals.

* * * * *